United States Patent
Hsieh et al.

(10) Patent No.: US 7,787,919 B2
(45) Date of Patent: Aug. 31, 2010

(54) ELECTRONIC DEVICE AND SLIDING MECHANISM THEREOF

(75) Inventors: Fu-Chung Hsieh, Taoyuan County (TW); Hsi-Hsing Hsu, Taoyuan County (TW); Chin-Lin Chang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 232 days.

(21) Appl. No.: 12/207,018

(22) Filed: Sep. 9, 2008

(65) Prior Publication Data

US 2009/0147453 A1    Jun. 11, 2009

(30) Foreign Application Priority Data

Dec. 6, 2007    (TW) ............................... 96146490 A (51) Int. Cl.
*H04M 1/00* (2006.01)
*G06F 1/16* (2006.01)

(52) U.S. Cl. ................................. 455/575.4; 361/679.55
(58) Field of Classification Search ............ 361/679.55; 455/575.4
See application file for complete search history.

(56) References Cited

U.S. PATENT DOCUMENTS

| | | | |
|---|---|---|---|
| 7,542,788 B2* | 6/2009 | Lee | 455/575.4 |
| 7,574,243 B2* | 8/2009 | Lee | 455/575.4 |
| 7,580,726 B2* | 8/2009 | Maatta et al. | 455/550.1 |
| 7,725,143 B2* | 5/2010 | Liu | 455/575.4 |
| 2004/0085739 A1* | 5/2004 | Lee et al. | 361/727 |
| 2006/0046796 A1* | 3/2006 | Park et al. | 455/575.4 |
| 2007/0097607 A1* | 5/2007 | Lee | 361/679 |
| 2007/0155448 A1* | 7/2007 | Hong | 455/575.4 |
| 2008/0099969 A1* | 5/2008 | Kim et al. | 267/167 |
| 2008/0146297 A1* | 6/2008 | Ho | 455/575.4 |
| 2009/0027836 A1* | 1/2009 | Wakihara | 361/679 |
| 2009/0027837 A1* | 1/2009 | Cho et al. | 361/679.01 |
| 2009/0029741 A1* | 1/2009 | Satou et al. | 455/566 |
| 2009/0035056 A1* | 2/2009 | Kim et al. | 403/326 |
| 2009/0069058 A1* | 3/2009 | Taschke | 455/575.4 |
| 2009/0279234 A1* | 11/2009 | Lee | 361/679.01 |
| 2010/0061042 A1* | 3/2010 | Horng | 361/679.01 |

* cited by examiner

*Primary Examiner*—Lisa Lea-Edmonds
(74) *Attorney, Agent, or Firm*—Birch, Stewart, Kolasch & Birch, LLP (57) ABSTRACT

A sliding mechanism is disclosed, wherein the sliding mechanism movably connects to a display module and an input module of an electronic device. The sliding mechanism includes a first member, a second member, a connection member, and a cover movably disposed on the first member. The first member is movable with respect to the second member and has an opening. A flexible printed circuit (FPC) of the electronic device is disposed through the opening and electronically connects to the display module and the input module. The connection member connects the first and second members at opposite sides thereof, and a middle portion of the connection member connects to the cover. When the first member slides with respect to the second member in a first direction, the connection member impels the cover to block a part of the opening.

20 Claims, 9 Drawing Sheets

ELECTRONIC DEVICE AND SLIDING MECHANISM THEREOF

CROSS REFERENCE TO RELATED APPLICATIONS

This Application claims priority of Taiwan Patent Application No. 96146490, filed on Dec. 6, 2007, the entirety of which is incorporated by reference herein.

BACKGROUND OF THE INVENTION

1. Field of the Invention

The invention relates in general to an electronic device and in particular to an electronic device having a sliding mechanism.

2. Description of the Related Art

Figure 1A:
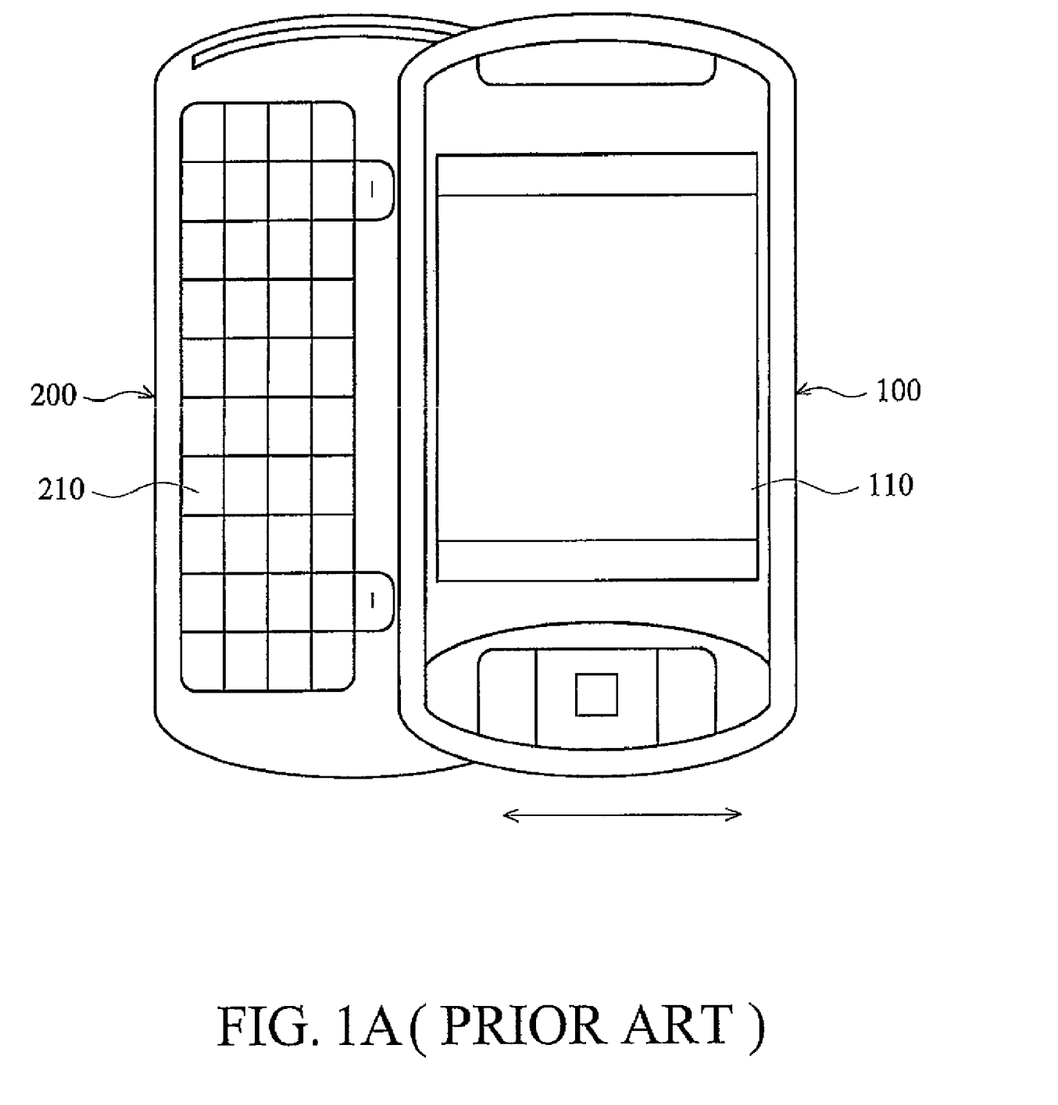
FIG. 1A is a perspective diagram of a conventional sliding-type electronic device.

Referring to FIG. 1A, a conventional sliding-type mobile phone or PDA includes a display module 100 and an input module 200, reciprocally movable with respect to each other (as the arrows indicate in FIG. 1A), wherein the display module 100 comprises a screen 110, and the input module 200 comprises a keypad 210.

Figure 1B:
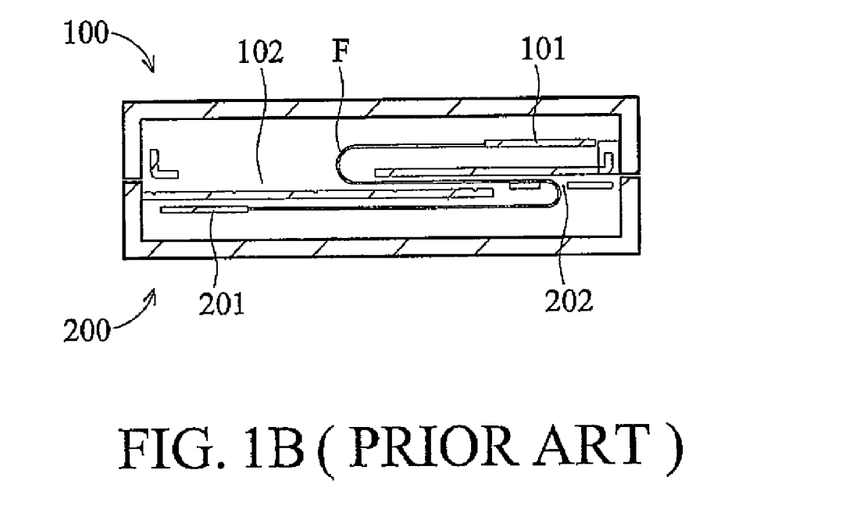
FIG. 1B is a sectional view of the electronic device in FIG. 1A.

Referring to FIG. 1B, a circuit board 101 is disposed in the display module 100, and another circuit board 201 is disposed in the input module 200. Specifically, a flexible printed circuit F is disposed through an opening 102 of the display module 100 and an opening 202 of the input module 200 for electrically connecting the circuit boards 101 and 201.

Figure 1C:
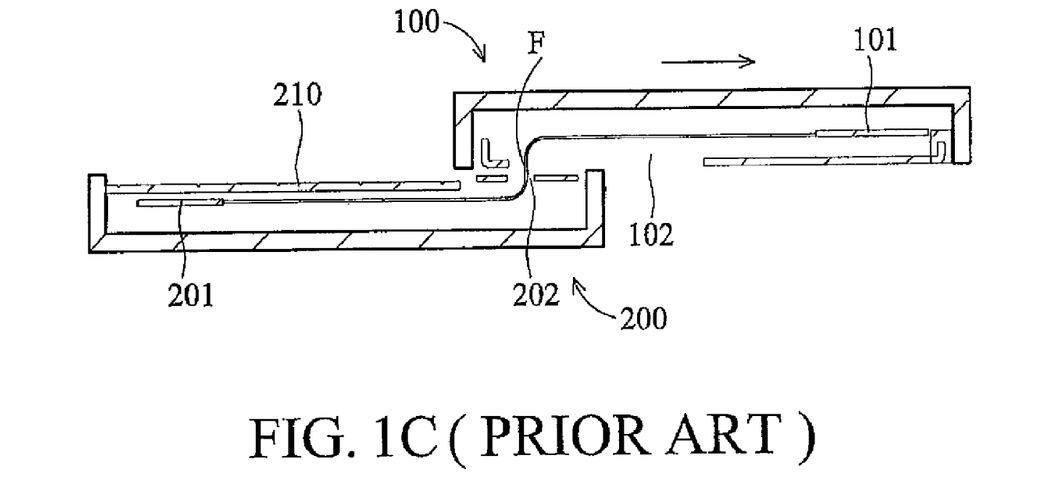
FIG. 1C is a sectional view of the electronic device in FIG. 1A when in an open state.

Referring to FIG. 1C, when the display module 100 slides relative to the input module 20 to an open state, the openings 102 and 202 overlap with the flexible printed circuit F extended therethrough. The overlapped region of the two openings 102 and 202 is considerable, because it may adversely reduce available area of the keypad 210. To maximize dimensions of the keypad 210 of the sliding-type mobile phone or PDA, the overlapped region of the openings 102 and 202 has to be minimized. Meanwhile, when the overlapped region of the two openings 102 and 202 is inadequate, the flexible printed circuit F can be exposed to the exterior through the opening 102, as shown in FIG. 1C. Thus, external object intrusion or the user may damage the flexible printed circuit F through the opening 102.

BRIEF SUMMARY OF INVENTION

The invention provides a sliding mechanism movably connecting a display module and an input module of an electronic device. The sliding mechanism includes a first member, a second member, a connection member, and a cover movably disposed on the first member. The first member is movable with respect to the second member and has an opening. A flexible printed circuit (FPC) of the electronic device is disposed through the opening and electronically connects the display module and the input module. The connection member connects the first and second members at opposite sides thereof, and a middle portion of the connection member is connected to the cover. When the first member slides with respect to the second member in a first direction, the connection member impels the cover to block a part of the opening.

BRIEF DESCRIPTION OF DRAWINGS

The invention can be more filly understood by reading the subsequent detailed description and examples with references made to the accompanying drawings, wherein.

DETAILED DESCRIPTION OF INVENTION

First Embodiment

Figure 2A:
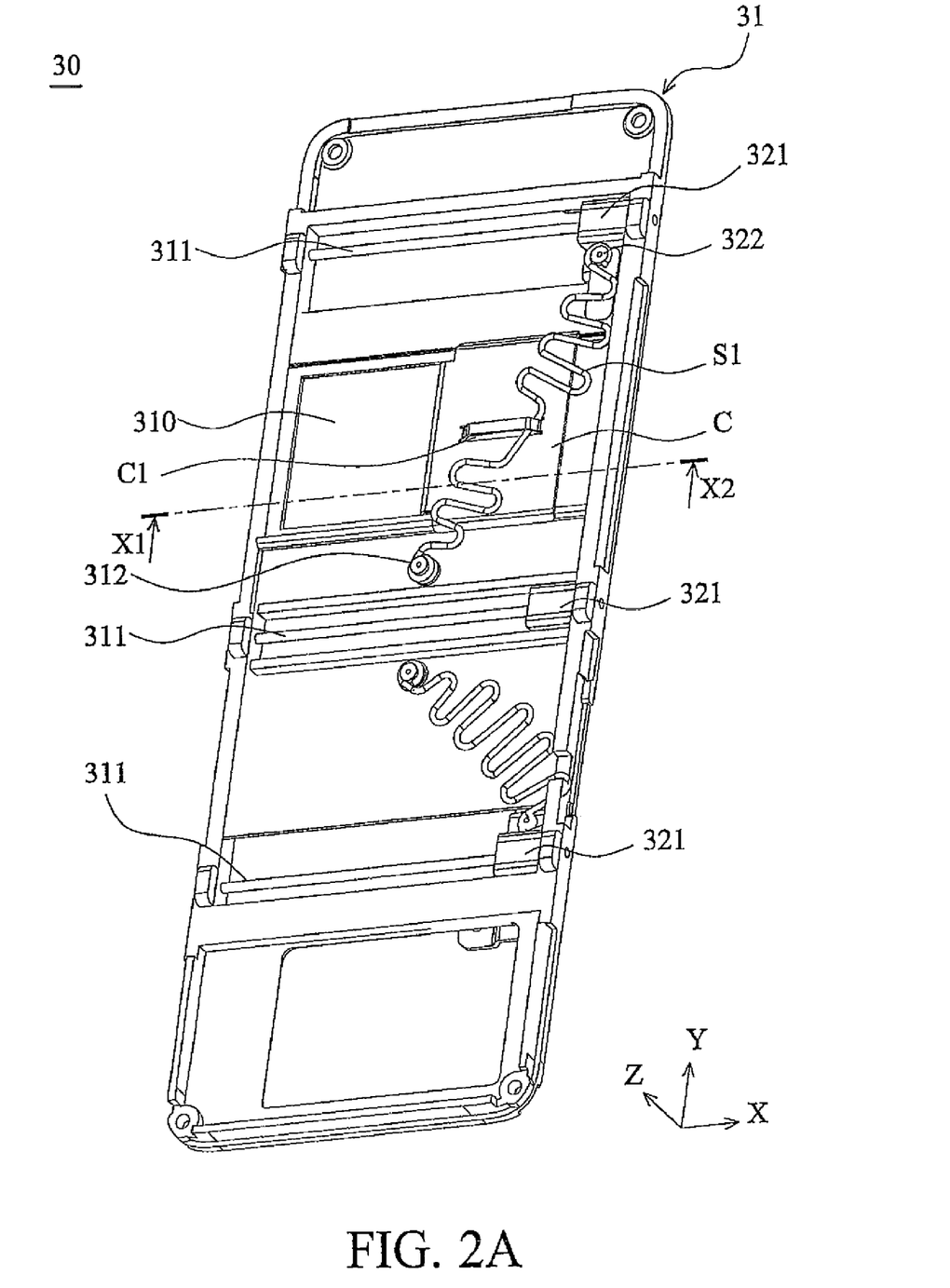
FIG. 2A is a perspective diagram of a first embodiment of a sliding mechanism.
Figure 2B:
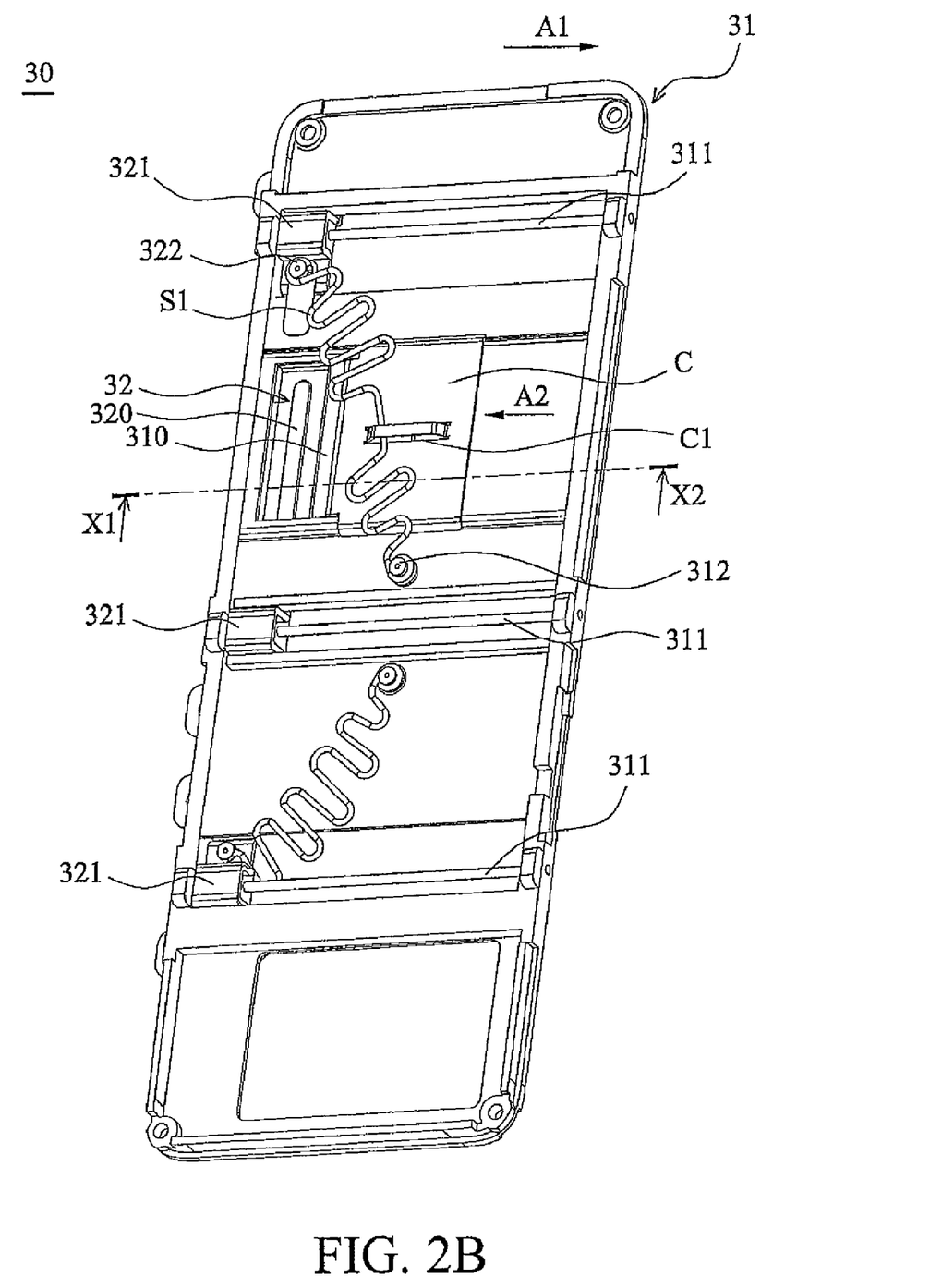
FIG. 2B is a perspective diagram of a sliding mechanism when a first member slides relative to the second member in a first direction.
Figure 3A:
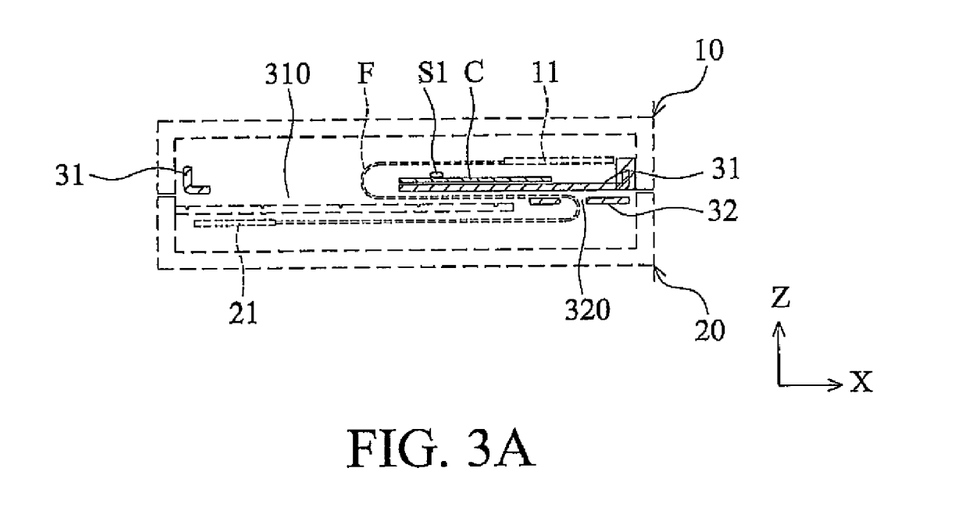
FIG. 3A is a sectional views along X1-X2 in FIG. 2A.
Figure 3B:
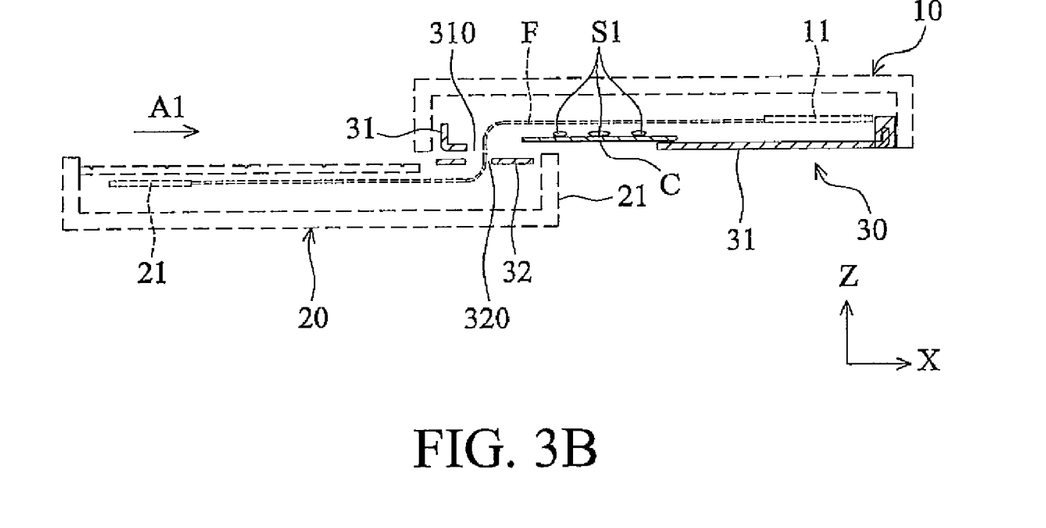
FIG. 3B is a sectional views along X1-X2 in FIG. 2A.

FIGS. 2A~3B illustrate a first embodiment of a sliding mechanism 30, wherein FIGS. 3A and 3B are sectional views along X1-X2 in FIGS. 2A and 2B, respectively. As shown in FIGS. 3A and 3B, the sliding mechanism 30 is disposed between a display module 10 and an input module 20 of an electronic device, such that the display module 10 and the input module 20 are reciprocally movable with respect to each other. Here, the electronic device can be a mobile phone, PDA, pocket PC, ultra mobile personal computer (UMPC) or tablet PC.

In this embodiment, the sliding mechanism 30 comprises a first member 31, a second member 32, a cover C, and a connection member S1. The first member 31 is fixed to the bottom of the display module 10 and is adjacent to the input module 20. The second member 32 is fixed to the input module 20. The first and second members 31 and 32 are reciprocally movable with respect to each other along X axis, so that the display module 10 and the input module 20 can be switched between a closed state (FIG. 3A) and an open state (FIG. 3B). Here, a flexible printed circuit F of the electronic device is disposed through an opening 310 of the first member 31 and a slot 320 of the second member 32 for electrically connecting the circuit board 11 inside the display module 10 and the circuit board 21 inside the input modules 20, respectively. In some embodiments, the first member 31 and the second member 32 can reciprocally slide with respect to each other along X or Y axis, such that the electronic device is switchable in either horizontal or vertical direction.

Referring to FIGS. 2A and 2B, the sliding mechanism 30 is substantially parallel to an XY plane. The cover C is movably connected to the first member 31, and opposite ends of the connection member S1 are pivotally connected to a first pivot portion 312 of the first member 31 and a second pivot portion 322 of the second member 32, respectively. In this embodiment, the cover C has a hole C1 with a middle portion of the connection member S1 disposed therethrough. Although the cover C and the connection member S1 are described above, in light of this disclosure, it is understood that the cover C and the connection member S1 can be connected or coupled using other techniques.

As shown in FIGS. 2B and 3B, when the display module 10 slides with respect to the input module 20 from the closed state to the open state, the first member 31 slides with respect to the second member 32 along the first direction A1. Here, the cover C is dragged by the connection member S1 and blocks a part of an opening 310 of the first member 31. Referring to FIG. 3B, when the display module 10 slides along the first direction A1 (parallel to an X axis), the cover C is moved with the first member 31 and projects from an edge 21 of the input module 20. Simultaneously, the cover C is also dragged by the connection member S1 and moves relative to the first member 31 along a second direction A2 (opposite to the first direction A1), as shown in FIG. 2B. Thus, the cover C can block a part of the opening 310 and protect the flexible printed circuit F.

In FIG. 2B, the second member 32 is substantially longitudinal and perpendicular to an X axis, comprising three sliding portions 321 along three rods 311 of the first member 31, respectively. However, the first member 31 and the second member 32 can also be movably connected by any type of sliding mechanism to facilitate reciprocal sliding therebetween. In this embodiment, the connection member S1 can be a flexible or elastic component, such as an extension spring, a compression spring or a torsion spring, for dragging the cover C and facilitating semi-auto sliding between the first member 31 and the second member 32.

Second Embodiment

Figure 4A:
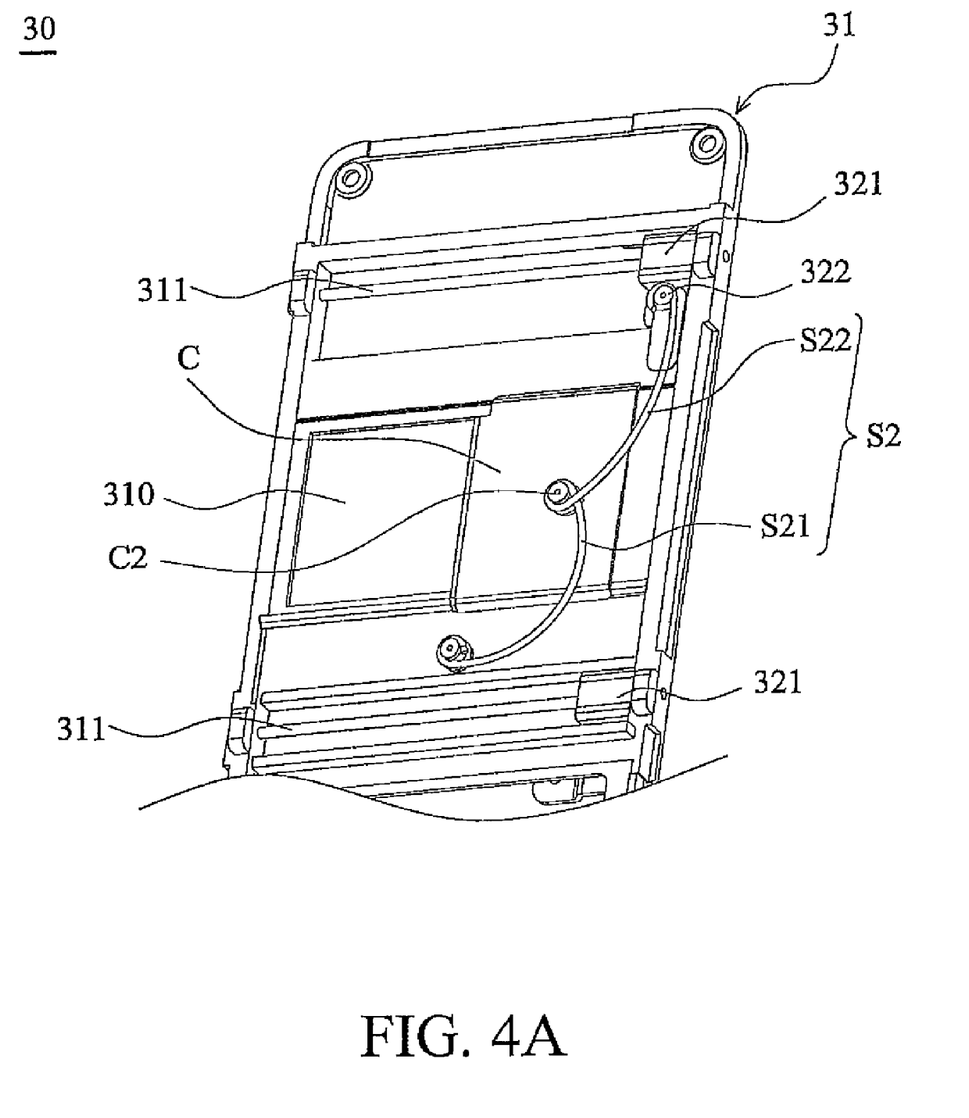
FIGS. 4A and 4B are perspective diagrams of a second embodiment of a sliding mechanism.
Figure 4B:
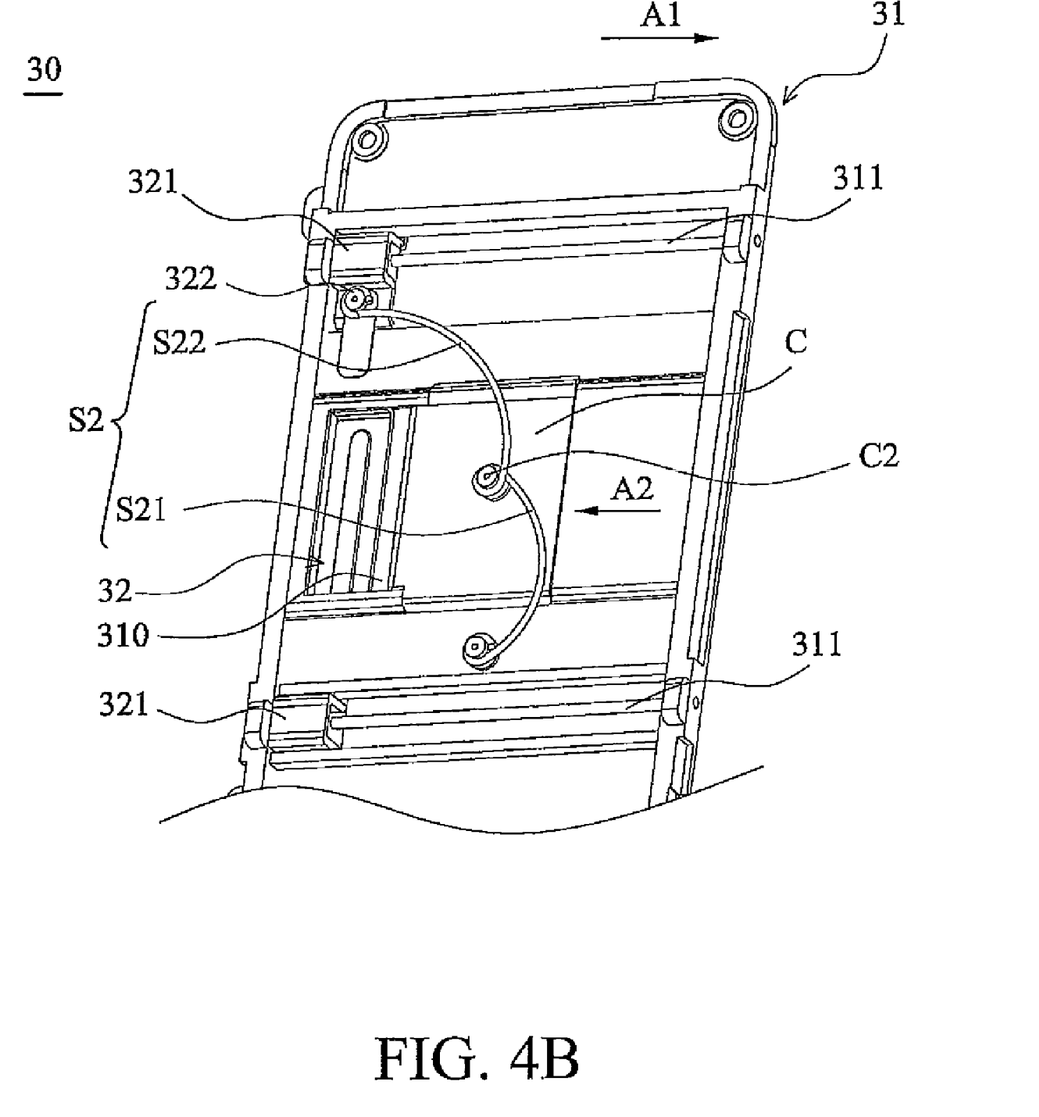

Referring to FIGS. 4A and 4B, the sliding mechanism 30 of the second embodiment comprises a flexible connection member S2, such as a elongated metal component, having a first section S21 and a second section S22, wherein the first section S21 connects the first member 31 to the cover C, and the second section S22 connects the second member 32 to the cover C, which is different from the connection member S1 in the first embodiment. In FIGS. 4A and 4B, a middle portion of the connection member S2 is bonded to a protrusion C2 of the cover C and the two ends of the connection member S2 are connected to the first member 31 and the second member 32, respectively.

When the first member 31 slides relative to the second member 32 along the first direction A1, as shown in FIG. 4B, the cover C is dragged by the connection member S2 and slides relative to the first member 31 along the second direction A2, so as to cover a part of the opening 310 and protect the flexible printed circuit F.

Third Embodiment

Figure 5A:
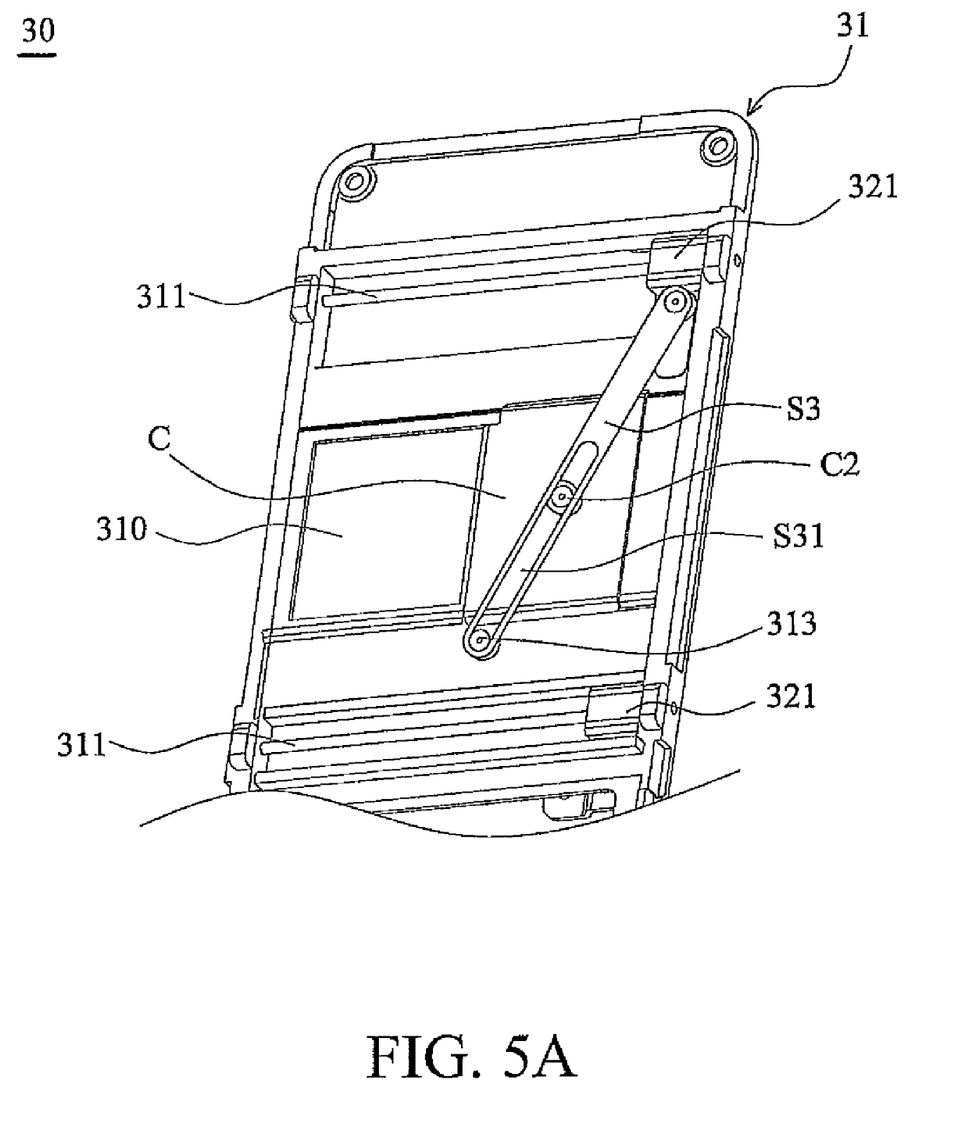
FIGS. 5A and 5B are perspective diagrams of a third embodiment of a sliding mechanism.
Figure 5B:
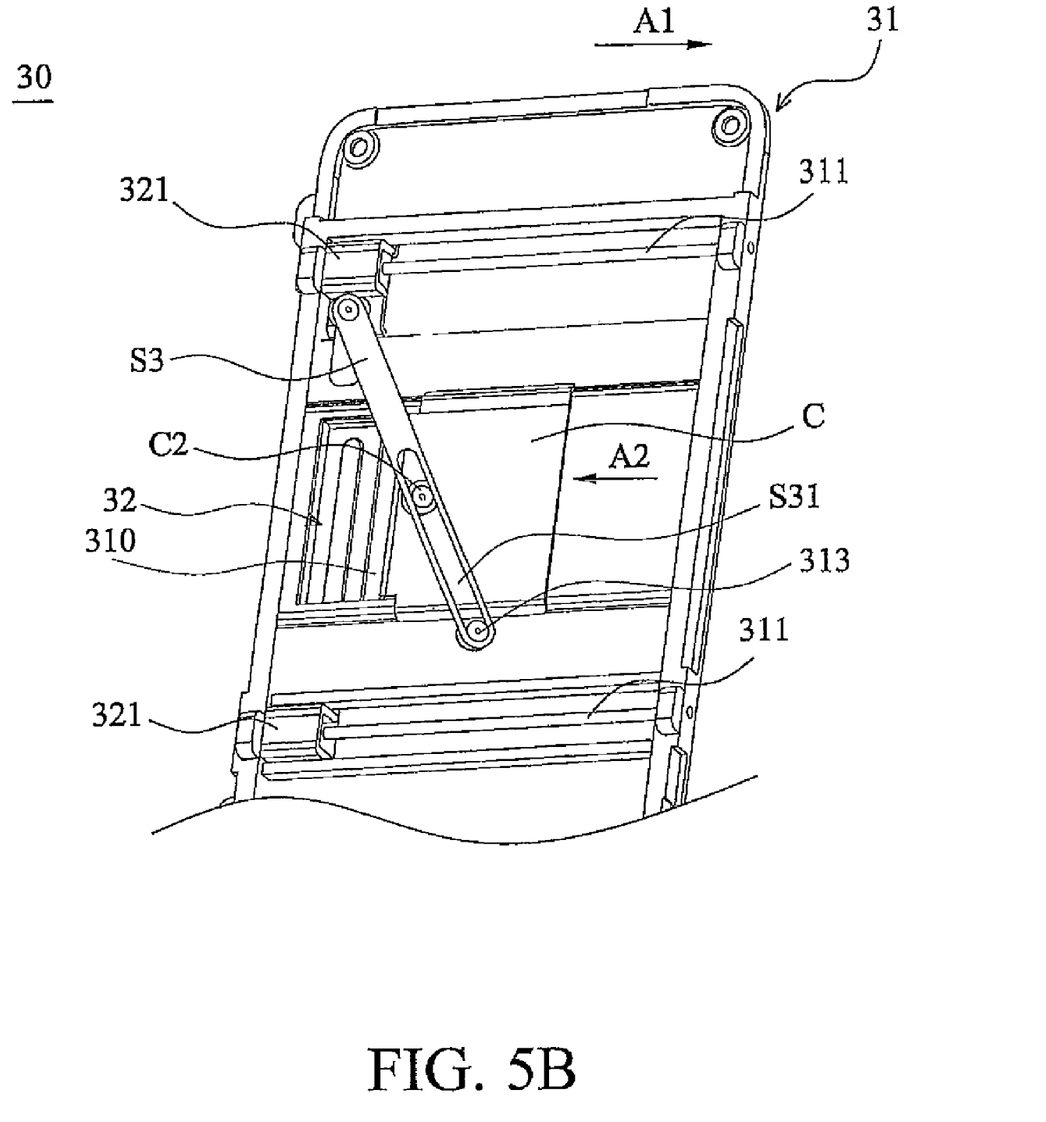

Referring to FIGS. 5A and 5B, the sliding mechanism 30 of the third embodiment comprises an elongated connection member S3, wherein an upper end of the connection member S3 is pivotally connected to the second member 32. Specifically, the connection member S3 has a longitudinal hollow groove S31, the first member 31 has a first protrusion 313, and the cover C has a second protrusion C2, wherein the protrusions 313 and C2 are movably received in the groove S31. When the first member 31 slides relative to the second member 32 along the first direction A1, as shown in FIG. 5B, the protrusions 313 and C2 slide along the groove S31. Simultaneously, the connection member S3 slides the cover C relative to the first member 31 along the second direction A2, so as to cover a part of the opening 310 and protect the flexible printed circuit F.

The invention provides a sliding mechanism disposed between a display module and an input module of an electronic device, such as a sliding-type mobile phone or PDA. The sliding mechanism has an opening with a flexible printed circuit disposed therethrough for electrical connection between the display module and the input module. When the display module slides relative to the input module to an open state, a cover of the sliding mechanism blocks a part of the opening, so as to prevent the flexible printed circuit from exposure and damage.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
    a display module;
    an input module;
    a sliding mechanism disposed between the display module and the input module, wherein the sliding mechanism comprising:
        a first member, connecting the display module and having an opening;
        a cover, movably disposed on the first member;
        a second member, connecting the input module and the first member, wherein the first member is movable with respect to the second member;
        a connection member, connecting the first and second members at opposite sides thereof and comprising a middle portion connected to the cover, wherein when the first member slides with respect to the second member in a first direction, the connection member impels the cover to block a part of the opening; and
    a flexible printed circuit, disposed through the opening and electrically connecting the display module and the input module.

2. The electronic device as claimed in claim 1, wherein when the first member moves in the first direction relative to the second member, the connection member impels the cover relative to the first member opposite to the first direction.

3. The electronic device as claimed in claim 1, wherein the second member has a slot with the flexible printed circuit disposed therethrough to connect to the display module and the input module.

4. The electronic device as claimed in claim 1, wherein the connection member comprises an extension spring, a compression spring or a torsion spring.

5. The electronic device as claimed in claim 1, wherein the cover has a hole, and the connection member is disposed through the hole and is pivotally connected to the first and second members.

6. The electronic device as claimed in claim 1, wherein the connection member has a first section and a second section, and the first section connects the first member to the cover, and the second section connects the cover to the second member.

7. The electronic device as claimed in claim 1, wherein the first member has a first protrusion, the cover has a second protrusion, the connection member has a groove, and the first and second protrusions slide along the groove when the first member moves in the first direction relative to the second member.

8. The electronic device as claimed in claim 1, wherein the first member has a plurality of rods, and the second member has a plurality of sliding portions corresponding to the rods, and the sliding portions respectively slide along the rods when the first member moves in the first direction relative to the second member.

9. The electronic device as claimed in claim 1, wherein the second member is substantially longitudinal and perpendicular to the first direction.

10. The electronic device as claimed in claim 1, wherein when the first member moves in the first direction relative to the second member, the cover protrudes from an edge of the input module and blocks a part of the opening, to protect the flexible printed circuit from exposure.

11. A sliding mechanism movably connecting a display module and an input module of an electronic device, wherein a flexible printed circuit of the electronic device is disposed through the sliding mechanism for connecting the display to the input modules, and the sliding mechanism comprising:
 a first member, connecting to the display module and having an opening with the flexible printed circuit disposed therethrough;
 a cover, movably disposed on the first member;
 a second member, connecting the input module to the first member, wherein the first member is movable with respect to the second member; and
 a connection member, connecting the first and second members at opposite sides thereof and comprising a middle portion connected to the cover, wherein when the first member slides with respect to the second member in a first direction, the connection member impels the cover to block a part of the opening.

12. The sliding mechanism as claimed in claim 11, wherein when the first member moves in the first direction relative to the second member, the connection member impels the cover relative to the first member opposite to the first direction.

13. The sliding mechanism as claimed in claim 11, wherein the connection member is flexible.

14. The sliding mechanism as claimed in claim 11, wherein the connection member comprises an extension spring, a compression spring or a torsion spring.

15. The sliding mechanism as claimed in claim 11, the cover comprising a hole, wherein the connection member is disposed through the hole and pivotally connected to the first and second members.

16. The sliding mechanism as claimed in claim 11, wherein the connection member has a first section and a second section, and the first section connects the first member to the cover, and the second section connects the cover to the second member.

17. The sliding mechanism as claimed in claim 11, wherein the first member has a first protrusion, the cover has a second protrusion, the connection member has a groove, and the first and second protrusions slide along the groove when the first member moves in the first direction relative to the second member.

18. The sliding mechanism as claimed in claim 11, wherein the first member has a plurality of rods, and the second member has a plurality of sliding portions corresponding to the rods, and the sliding portions respectively slide along the rods when the first member moves in the first direction relative to the second member.

19. The sliding mechanism as claimed in claim 11, wherein the second member is substantially longitudinal and perpendicular to the first direction.

20. The sliding mechanism as claimed in claim 11, wherein the second member has a slot with the flexible printed circuit disposed therethrough to connect to the display module and the input module.

* * * * *